US006615587B1

(12) United States Patent
Schulze

(10) Patent No.: US 6,615,587 B1
(45) Date of Patent: Sep. 9, 2003

(54) COMBUSTION DEVICE AND METHOD FOR BURNING A FUEL

(75) Inventor: Günther Schulze, Seukendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/857,939

(22) PCT Filed: Dec. 1, 1999

(86) PCT No.: PCT/EP99/09401

§ 371 (c)(1), (2), (4) Date: Jun. 12, 2001

(87) PCT Pub. No.: WO00/34714

PCT Pub. Date: Jun. 15, 2000

(30) Foreign Application Priority Data

Dec. 8, 1998 (EP) ........................................... 98123359

(51) Int. Cl.[7] ................................................ F02C 7/22
(52) U.S. Cl. ........................................... 60/737; 60/740
(58) Field of Search ......................... 60/776, 734, 740, 60/737; 431/114

(56) References Cited

U.S. PATENT DOCUMENTS

| | | | | | |
|---|---|---|---|---|---|
| 3,958,413 | A | * | 5/1976 | Cornelius et al. | 60/778 |
| 4,761,958 | A | * | 8/1988 | Hellat | 60/737 |
| 4,835,962 | A | * | 6/1989 | Rutter | 60/737 |
| 5,211,004 | A | * | 5/1993 | Black | 60/39.27 |
| 5,661,969 | A | * | 9/1997 | Beebe et al. | 60/39.281 |

FOREIGN PATENT DOCUMENTS

| | | |
|---|---|---|
| DE | 44 30 697 C1 | 2/1996 |
| DE | 44 30 698 C1 | 2/1996 |
| EP | A122526 | 10/1984 |
| EP | A572202 | 12/1993 |
| EP | 0 745 803 A2 | 12/1996 |
| GB | 2 224 315 A | 5/1990 |
| WO | WO 93/10401 | 5/1993 |

OTHER PUBLICATIONS

Holman, J.P., "Experimental Methods for Engineers", McGraw Hill Kogakusha, Tokyo1971, pp. 188–190, in particular Fig. 7–5.*

"Combustion–Driven Oscillations In Industry", Abbot A. Putnam, *American Elsevier*, New York, pp. 2–5, 1971.

"Formulierung der Kontinuitatsbedingungen an plotzlichen Querschnittssprungen und anderen Diskontinuitaten", C. Faber, pp. 50–57, Verlag Shaker, Austria 1993.

"Technische Stromuugslhre" Willi Bohl, Vogel–Verlag, Wurzburg 1994.

European Standard EN ISO 5167–1, Sep. 1995.

* cited by examiner

*Primary Examiner*—Ehud Gartenberg
(74) *Attorney, Agent, or Firm*—Harness, Dickey & Pierce, P.L.C.

(57) ABSTRACT

A combustion device for the combustion of fuel, includes a supply duct for supplying a fuel to a combustion zone. The fuel is capable of being guided through the supply duct in a fluid stream with a direction of flow and at a nominal velocity lying within a nominal operating interval. Further, the supply duct is narrowed in an uncoupling region, such that at the nominal velocity, sound waves running opposite to the direction of flow in the fluid stream from the combustion zone are at least partially reflected in the uncoupling region.

18 Claims, 1 Drawing Sheet

COMBUSTION DEVICE AND METHOD FOR BURNING A FUEL

COMBUSTION DEVICE AND METHOD FOR THE COMBUSTION OF A FUEL

This application is the national phase under 35 U.S.C. §371 of PCT International Application No. PCT/EP99/09401 which has an International filing date of Dec. 1, 1999, which designated the United States of America.

1. Field of the Invention

The invention relates to a combustion device for the combustion of a fuel, the fuel being capable of being supplied to the combustion as a fluid stream via a supply duct. The invention also relates to a corresponding method.

2. Background of the Invention

In the book "Technische Strömungslehre" ["Technical Fluid Mechanics"] by Willi Bohl; $10^{th}$ edition, Vogel-Verlag, Wurzburg 1994, outflow processes are described in Chapter 5.6. Illustrated in more detail are processes for the outflow of a fluid from a vessel, in which the fluid is stored at the pressure $p_i$ and the density $\rho_i$. The fluid emerges from the vessel as a jet, the jet pressure $P_a$ prevailing in the jet. The pressure ratio in the case of which, in the event of a given vessel state, that is to say a given vessel pressure $p_i$ and a given fluid density $\rho_i$ and also in the case of a given vessel orifice from which the fluid emerges, the mass flow of fluid no longer changes, is designated as the critical pressure ratio $(P_a/P_i)_{(k)}$. Depending on the size of the pressure ratio $P_a/P_i$, a distinction is made between two types of outflow processes: 1. Subcritical outflow; 2. Supercritical outflow.

A Laval nozzle is described in section 5.6.2 of the same book. The Laval nozzle serves for expanding the outflowing fluid beyond the critical pressure ratio and for consequently increasing the flow velocity beyond sound velocity. For this purpose, the fluid is first compressed by a narrowing duct, the flow velocity increasing up to sound velocity. This is followed by a widening duct section, in which the fluid expands and the flow velocity reaches the supersonic range. Such a Laval nozzle serves, for example, for achieving maximum outflow velocities for thrust gases of rocket propulsion units. FIG. 5.25 illustrates various operating states of a Laval nozzle. In the operating state illustrated first, the outlet pressure of the fluid is above the critical pressure. The Laval nozzle behaves, here, in the same way as a Venturi tube. More detailed particulars as to the definition of a Venturi tube follow further below.

Compression flows are described in section 5.7 of the same book. Section 5.7.1 explains the functioning of a subsonic diffuser. Subsonic diffusers are ducts which are widened in the direction of flow and in which a flow running in the subsonic range is decelerated. The deceleration results in a pressure rise. Subsonic diffusers are found, for example, in jet appliances, Venturi tubes and in the guide wheels and outlet casings of turbocompressors. Section 5.7.2 describes a supersonic diffuser, in which the duct cross section narrows in the direction of flow.

European Standard EN ESO 5167-1 relates to throughflow measurements of fluids by means of throttle devices. Diaphragms, nozzles and Venturi tubes in full-throughflow lines of circular cross section are described in Part 1. FIG. 10 shows a classic Venturi tube. A fluid flows through the Venturi tube in a direction of flow. The Venturi tube consists of an entry cone narrowing in the direction of flow and of a widening exit cone following the entry cone in the direction of flow. A pronounced pressure loss occurs in the entry cone. This pressure loss is for the most part compensated again by the exit cone, so that the overall pressure loss occurring through the Venturi tube, as compared with a tube of invariable cross section and the same length, remains low.

In the book "Berechnung der Schallausbreitung in durchströmten Kanälen von Turbomaschinen unter besonderer Berücksichtigung der Auslegung von Drehtonschalld ämpfern" ["Calculation of the sound propagation in throughflow ducts of turbomachines, taking particular account of the design of rotational sound dampers "] by Christian Faber, Verlag Shaker, Aachen 1993, section 3.4 illustrates how discontinuities in flow ducts influence the propagation of sound in a fluid flowing in these flow ducts. Scatter, reflection and transmission factors are derived, from which it is possible to calculate which part of incident sound energy passes the discontinuity and which part is reflected.

SUMMARY OF THE INVENTION

One object of the invention is to specify a combustion device which has beneficial properties in terms of controlling and influencing the propagation and formation of sound waves induced by combustion. A further object of the invention is to specify a corresponding method.

These and other objects are achieved, according to the invention, by specifying a combustion device for the combustion of fuel, with a supply duct for supplying the fuel to a combustion zone, the fuel being capable of being guided through the supply duct as a fluid stream with a direction of flow and at a nominal velocity lying within a nominal operating interval, and the supply duct being narrowed in a decoupling region, in such a way that, at the nominal velocity, sound waves running opposite to the direction of flow in the fluid stream from the combustion zone are at least partially reflected in the decoupling region.

During combustion, combustion oscillations may arise, in that, in the event of a fluctuation in a release of power during combustion, a pressure pulse occurs in the fluid stream. Such a pressure pulse in the fluid stream results, in turn, in unevenness in the mass flow of the fluid stream entering the combustion zone. This again leads to a release of power fluctuating in time during combustion. Depending, for example, on the geometric designs of the supply duct, positive feedback may be produced between pressure pulses in the fluid stream and the fluctuating release of power during combustion. A combustion oscillation is formed. Such a combustion oscillation may have a disturbing effect, for example, in the form of considerable noise pollution. In the case of large releases of power, however, vibrations may also occur in the combustion device, which may ultimately result in damage. The invention proceeds from the knowledge that the propagation of sound waves in the fuel via the supply duct into further acoustically coupled regions is conducive to the tendency to the formation of such combustion oscillations. This mechanism is prevented by an acoustic decoupling of the supply duct or else of a plurality of supply ducts for the fuel. Such acoustic decoupling is achieved by a narrowing of the supply duct or supply ducts.

By virtue of such narrowing in the direction of flow, known hitherto only with regard to airborne sound dampers, the flow velocity of the fluid is increased. In this case, the flow velocity may be increased to an extent such that sound waves running toward the narrowing opposite to the direction of flow are reflected. The narrowing is designed in such a way that, at a nominal velocity of the fluid stream in the supply duct, such a high acceleration of the fluid is obtained at the narrowing that a high proportion of the sound waves running toward the narrowing is reflected. The nominal velocity is, for example, within a velocity interval which corresponds to those operating states of the combustion device in which there is a high tendency to the formation of combustion oscillations.

The uncoupling region is designed preferably as a continuous narrowing of the supply duct in the direction of flow. At such a continuous narrowing, lower flow and pressure losses due to turbulence are obtained, as compared with a discontinuous narrowing. Such a continuous narrowing could, for example, be designed in a similar way to the supersonic diffuser described by Willi Bohl in the above-mentioned book.

Preferably, the decoupling region is followed in the direction of flow by a pressure increase region which corresponds to a widening of the supply duct. The pressure in the fluid stream is increased by means of such a pressure increase region. This is carried out as a result of the widening of the supply duct. The passage consisting of the decoupling region and of the pressure increase region thus corresponds, for example, to the Venturi tube illustrated in the European standard specified above or to a Laval nozzle. Such an embodiment is advantageous, in particular, when a high fluid mass flow has to be provided. Thus, what is achieved by the combination of the uncoupling region and pressure increase region is that in the combustion device, a large release of power can be obtained with the aid of a high fluid mass flow, while at the same time an effective acoustic decoupling of the combustion zone and supply duct is provided.

The combustion zone is preferably located in a combustion chamber. The combustion chamber may have any desired shape, but it is particularly important to have a tubular or annular combustion chamber. In a combustion chamber, combustion oscillations may be formed as a result of interaction between a power fluctuation during combustion and characteristic acoustic modes of the combustion chamber. Such combustion chamber oscillations may be propagated into fluidically coupled spaces, for example advancing into the fuel or air supply lines and, in some circumstances as far as a supply pump, which may thereby be subjected to high mechanical load. Acoustic decoupling by means of the narrowing of the supply duct prevents such a propagation of the combustion chamber oscillations. Moreover, the tendency to the formation of combustion chamber oscillations at all is reduced, since the acoustic resonance space available for the combustion chamber oscillations is reduced as a result of the decoupling of the supply duct.

The combustion device is preferably a gas turbine, in particular with an annular combustion chamber. In a gas turbine, there is a particularly high release of power during combustion. Combustion oscillations may therefore lead, here, to particularly serious noise pollution and damaging vibrations. In an annular combustion chamber, it is virtually impossible to predict characteristic acoustic modes due to the complicated geometry, so that the formation of combustion chamber oscillations is particularly difficult to prevent here. Acoustic decoupling between the annular combustion chamber and the supply ducts for the combustion media is therefore of particular importance here.

Objects are further achieved, according to the invention, by specifying a method for the combustion of fuel, the fuel being supplied to a combustion zone as a fluid stream with a direction of flow and at a nominal velocity lying within a nominal operating interval, and the fluid stream being narrowed in a decoupling region, in such a way that, at the nominal velocity, sound waves running opposite to the direction of flow in the fluid stream from the combustion zone are at least partially reflected in the decoupling region.

The advantages of such a method emerge correspondingly from the above statements regarding the advantages of the combustion device.

The fluid stream is preferably narrowed continuously in the direction of flow. Preferably, the pressure in the fluid stream is increased by a fluid stream widening which follows the narrowing. Also preferably, the fuel used is natural gas or oil. The fuel is preferably burnt in a combustion chamber of a gas turbine, in particular an annular combustion chamber.

BRIEF DESCRIPTION OF THE DRAWINGS

Exemplary embodiments of the invention are explained in more detail with reference to the drawing in which.

Identical reference symbols have the same significance in the various figures.

DETAILED DESCRIPTION OF THE PREFERRED EMBODIMENTS

Figure 1:
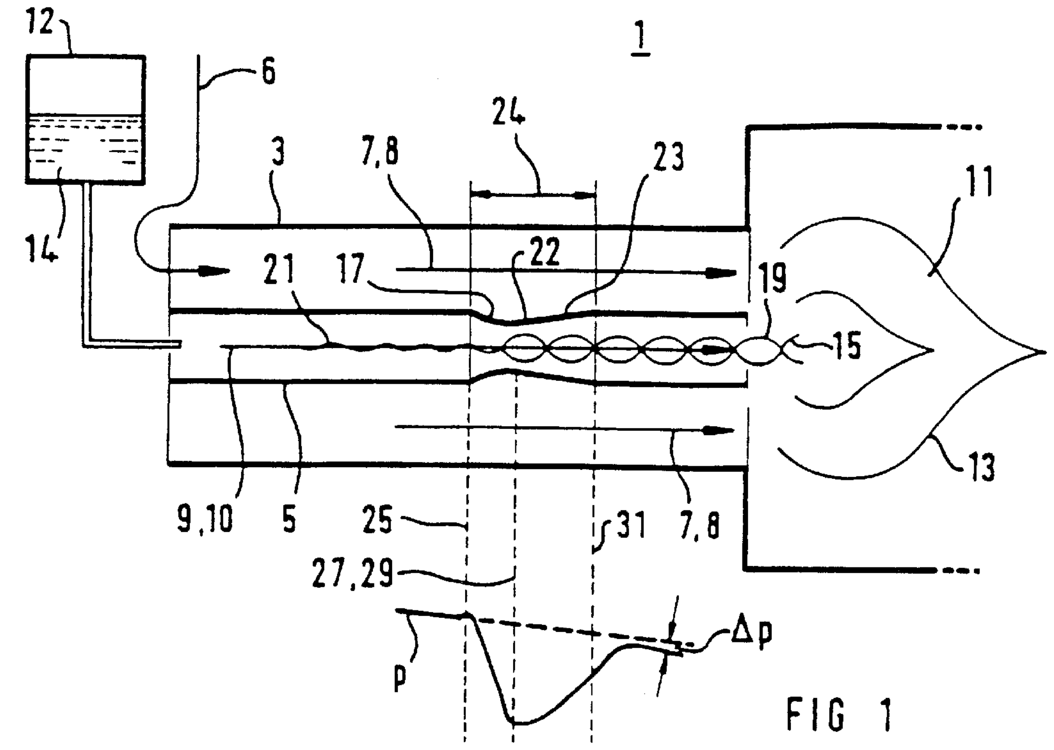
FIG. 1 shows a combustion device.

FIG. 1 shows a combustion device 1. Arranged concentrically in an air duct 3 of circular cross section is a fuel duct 5, likewise of circular cross section, which constitutes a supply duct 5. Air 6 in the form of an air stream 7 is guided in a direction of flow 8 in the air duct 3. Fuel 14, for example oil, from a fuel tank 12 is guided as a fluid stream 9 in a direction of flow 10 in the fuel duct 5. The air 6 and the fuel 14 are burnt in a flame 13 in a combustion zone 11. A fluctuation in the release of power during combustion gives rise to a sound wave 15 in the fluid stream 9 of the fuel 14. This sound wave 15 travels upstream, opposite to the direction of flow 10, in the fluid stream 9. In the case of a supply duct 5 of invariable cross section, the sound wave 15 could pass through the entire supply duct 5 and, for example, travel as far as a fuel pump, not illustrated, and possibly damage this. In such versions used hitherto, therefore, the combustion zone 11 had acoustically coupled to it by means of the supply duct 5 considerably extended spaces, through which the combustion oscillations could be propagated in the combustion device 1 and which, moreover, constitute resonance spaces which may be conducive to the formation of combustion oscillations.

By contrast, in the combustion device 1 shown here, acoustic decoupling of the supply duct 5 from the combustion zone 11 is achieved by means of a decoupling region 17. The decoupling region 17 is formed by a narrowing of the supply duct 5 in the direction of flow 10. The flow velocity of the fluid stream 9 is therefore increased in the decoupling region 17. The decoupling region 17 is designed in such a way that, at a nominal velocity of the fluid stream 9 in the supply duct 5, this flow velocity is increased sharply in the decoupling region 17, preferably to a value near sound velocity in the fluid stream. The sound wave 15 is thereby to a large part reflected in the decoupling region 17 as a reflection wave 19. The remaining part continues to run upstream through the supply duct 5 as a residual sound wave 21. The nominal velocity is within a nominal operating interval which corresponds to an interval of operating states near a full load and a full-load state. The full-load state of the combustion device I is the maximum value for a release of power during combustion. In operating states of the combustion device 1 which correspond to a lower release of power than full load, a lower reflection of the sound wave 15 takes place. Combustion oscillations may be particularly disturbing and harmful in proximity to the full-load state, since a high release of power occurs here. Where lower load states are concerned, therefore, a lower reflection of the sound wave 15 and consequently a greater propagation of the sound wave 15 are acceptable. The decoupling region 17 is followed by a pressure increase region 23. The decoupling region 17 forms, together with the pressure increase region 23, a reflection section 24 with a length 24 of the supply duct 5. The pressure increase region 23 corresponds to a widening of the supply duct 5, in this case to the cross section of the supply duct 5 which is also present in front of the decoupling region 17 in the direction of flow 10.

The reflection section 24 is a Venturi tube. The pressure increase region 23 is preferably designed in such a way that, at the nominal velocity, a maximum pressure increase in the fluid stream 9 is obtained. The decoupling region 17 has an inlet region 25 and an end region 27. The end region 27 is at the same time an inlet region 29 of the pressure increase region 23. The pressure increase region 23 terminates at an outlet region 31. A diagrammatic illustration of the pressure profile in the decoupling region 17 and in the pressure increase region 23 is also depicted in FIG. 1. A marked pressure loss occurs in the fluid stream 9 between the inlet region 25 of the decoupling region 17 and the end region 27 of the decoupling region 17. This pressure loss is for the most part compensated again in the pressure increase region 23; so that, overall, an only slight pressure loss Ap occurs, as compared with a pressure loss arising over this segment of the supply duct 5 in the case of an invariable cross section of the supply duct 5 (illustrated by broken lines).

Figure 2:
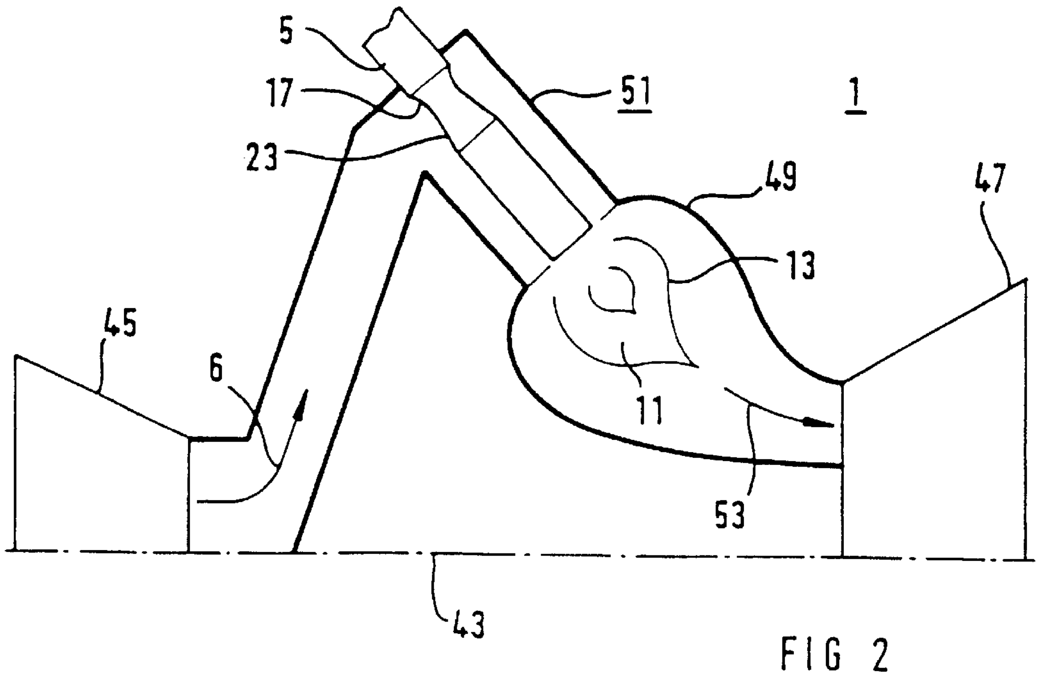
FIG. 2 shows a gas turbine, diagrammatically and not true to scale.

FIG. 2 shows diagrammatically a combustion device 1 designed as a gas turbine. A compressor 45 and a turbine 47 are arranged along an axis 43. Between the compressor 45 and turbine 47 is connected a combustion chamber 49 which is designed as an annular combustion chamber. A plurality of burners 51 open into the combustion chamber 49, only one burner 51 being illustrated here for the sake of clarity. The burner 51 has an air duct 3 which is fluidically connected to the compressor 45. The burner 51 has, furthermore, a supply duct 5 for the supply of natural gas 14. Here, therefore, combustion media are air 6 from the compressor 45 and natural gas 14. These burn in the combustion chamber 49. The hot fuel gases 53 occurring as a result drive the turbine 47. By virtue of the high release of power in such a gas turbine 1, combustion oscillations having particularly high amplitudes may arise. Such combustion oscillations may be formed as combustion chamber oscillations in the combustion chamber 49.

In order to prevent such combustion chamber oscillations from being propagatedvia the supply duct 5 to the entire natural-gas delivery system, not illustrated in any more detail, a decoupling region 17 is provided in the supply duct 5. This decoupling region is followed in the direction of flow by a pressure increase region 23. The effects and advantages of the decoupling region 17 and of the pressure increase region 23 correspond to those explained with regard to FIG. 1. The natural-gas delivery system, not illustrated in any more detail, is thus acoustically decoupled effectively from the combustion chamber 49.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustion device for combustion of a gaseous fuel comprising:

a combustion zone; and a supply duct for supplying the gaseous fuel to the combustion zone, the gaseous fuel being capable of being guided through the supply duct in a fluid stream with a direction of flow and at a nominal velocity lying within a nominal operating interval, wherein the supply duct is relatively narrowed in a decoupling region such that, at the nominal velocity, sound waves running opposite to the direction of flow in the fluid stream from the combustion zone are at least partially reflected in the decoupling region, wherein the decoupling region is followed in the direction of flow by a pressure increase region in which the supply duct relatively widens and wherein the decoupling region of the supply duct is arranged in an air duct for supplying air to the combustion zone.

2. The combustion device as claim in claim 1, wherein the decoupling region relatively narrows in the direction of flow.

3. The combustion device as claim in claim 1, wherein the supply duct has a circular cross section.

4. The combustion device as claimed in claim 1, wherein the decoupling region forms, together with the pressure increase region, a reflection section which is designed in the form of a Laval nozzle.

5. The combustion device as claimed in claim 1, wherein the decoupling region forms, together with the pressure increase region, a reflection section which is designed in the form of a Venturi tube.

6. The combustion device as claimed in claim 1, wherein the fuel is natural gas.

7. The combustion device as claimed in claim 1, wherein the combustion zone is located in a combustion chamber.

8. A gas turbine including the combustion device as claimed in claim 7.

9. The combustion device as claimed in claim 7, wherein the combustion chamber is designed as an annular combustion chamber.

10. The combustion device of claim 2, wherein the decoupling region continuously narrows in the direction of flow.

11. The combustion device as claimed in claim 1, wherein the supply duct has an annular cross section.

12. The combustion device as claimed in claim 2, wherein the decoupling region forms, together with the pressure increase region, a reflection section which is designed in the form of a Laval nozzle.

13. The combustion device as claimed in claim 2, wherein the decoupling region forms, together with the pressure increase region, a reflection section which is designed in the form of a Venturi tube.

14. The combustion device as claimed in claim 2, wherein the combustion zone is located in a combustion chamber.

15. The combustion device as claimed in claim 1, wherein the combustion zone is located in a combustion chamber.

16. A gas turbine including the combustion device as claimed in claim 14.

17. A gas turbine including the combustion device as claimed in claim 15.

18. The combustion device as claimed in claim 8, wherein the combustion chamber is designed as an annular combustion chamber.

* * * * *